(12) United States Patent
Bogineni et al.

(10) Patent No.: US 10,750,371 B2
(45) Date of Patent: Aug. 18, 2020

(54) UTILIZING MACHINE LEARNING TO PROVIDE CLOSED-LOOP NETWORK MANAGEMENT OF A FIFTH GENERATION (5G) NETWORK

(71) Applicant: Verizon Patent and Licensing Inc., Arlington, VA (US)

(72) Inventors: Kalyani Bogineni, Hillsborough, NJ (US); Ravi Potluri, Coppell, TX (US); Hans Raj Nahata, New Providence, NJ (US); Jin Yang, Orinda, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/218,131

(22) Filed: Dec. 12, 2018

(65) Prior Publication Data

US 2020/0196155 A1 Jun. 18, 2020

(51) Int. Cl.
| | |
|---|---|
| H04L 12/26 | (2006.01) |
| H04W 16/10 | (2009.01) |
| H04L 12/24 | (2006.01) |
| H04W 48/18 | (2009.01) |
| H04W 88/18 | (2009.01) |
| H04W 36/08 | (2009.01) |
| H04W 28/08 | (2009.01) |
| G06N 20/00 | (2019.01) |
| H04W 84/18 | (2009.01) |

(52) U.S. Cl.
CPC ............. *H04W 16/10* (2013.01); *H04L 41/12* (2013.01); *H04W 28/085* (2013.01); *H04W 36/08* (2013.01); *H04W 48/18* (2013.01); *H04W 88/18* (2013.01); *G06N 20/00* (2019.01); *H04W 84/18* (2013.01)

(58) Field of Classification Search
CPC ......... H04L 47/12; H04L 47/14; H04L 47/11; H04W 28/0289; H04W 28/08
See application file for complete search history.

(56) References Cited

U.S. PATENT DOCUMENTS

| | | | | |
|---|---|---|---|---|
| 2010/0034197 | A1* | 2/2010 | Das ........................ | H04L 47/70 370/352 |
| 2011/0213869 | A1* | 9/2011 | Korsunsky .......... | H04L 63/1483 709/223 |
| 2016/0352645 | A1* | 12/2016 | Senarath ............. | H04L 43/0876 |
| 2017/0078171 | A1* | 3/2017 | Tapia .................... | H04W 24/02 |
| 2017/0264556 | A1* | 9/2017 | Varga .................. | H04L 47/2483 |
| 2017/0332282 | A1* | 11/2017 | Dao .................... | H04W 72/087 |
| 2018/0262924 | A1* | 9/2018 | Dao ...................... | H04W 24/08 |
| 2018/0270126 | A1* | 9/2018 | Tapia .................. | H04L 41/0609 |

* cited by examiner

*Primary Examiner* — Atique Ahmed

(57) ABSTRACT

A device receives analytics data associated with management of a network associated with the device, core data associated with a core domain of the network, edge data associated with an edge domain of the network, and radio access network (RAN) data for a RAN associated with the network. The device processes the analytics data, the core data, the edge data, and the RAN data, with a machine learning model, to determine actions to be performed with respect to the core domain of the network, the edge domain of the network, and/or the RAN. The device causes the actions to be performed by one or more core devices associated with the core domain of the network, one or more edge devices associated with the edge domain of the network, and/or one or more RAN devices associated with the RAN.

20 Claims, 10 Drawing Sheets

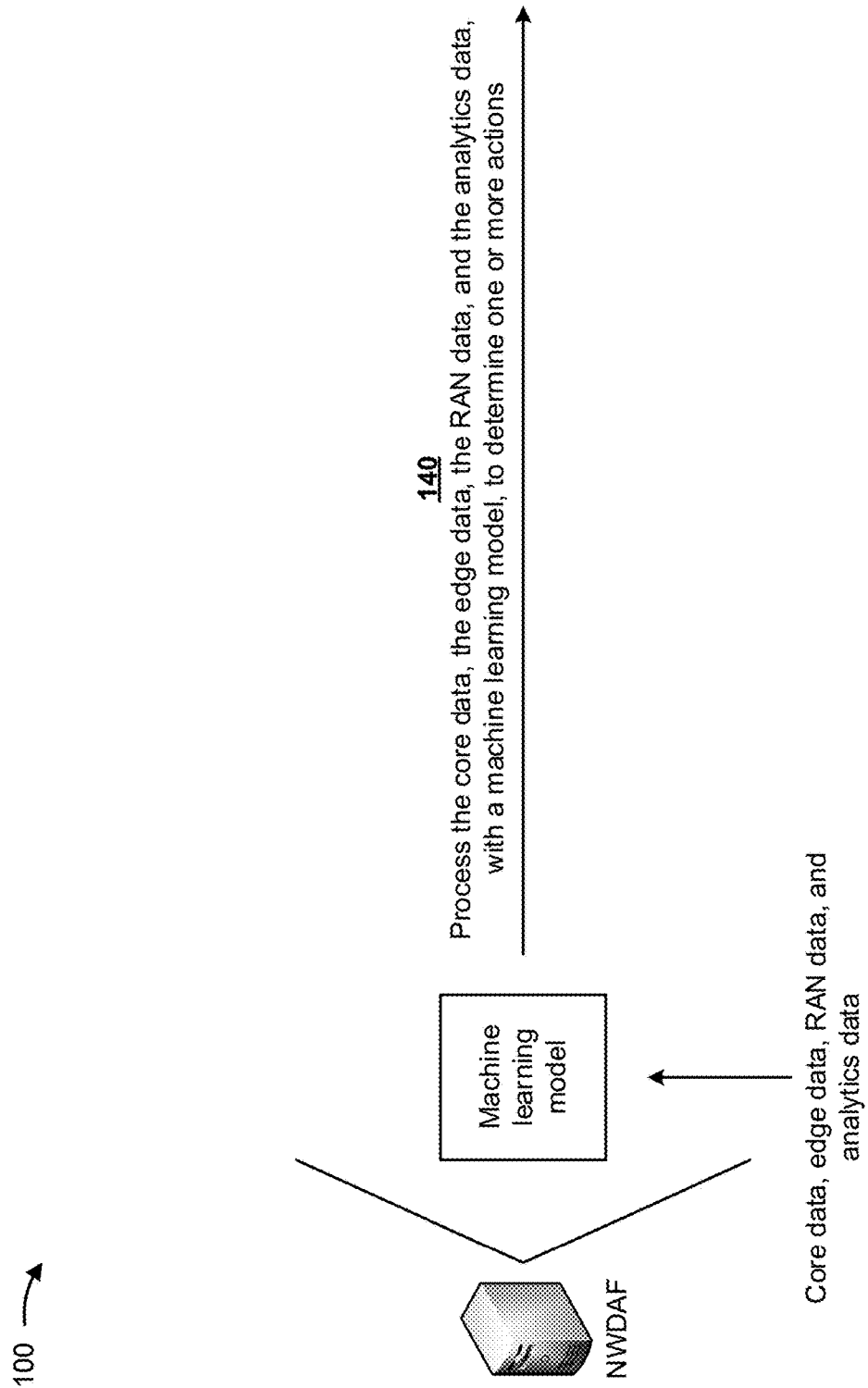

UTILIZING MACHINE LEARNING TO PROVIDE CLOSED-LOOP NETWORK MANAGEMENT OF A FIFTH GENERATION (5G) NETWORK

BACKGROUND

A fifth generation (5G) network, as specified by the Third Generation Partnership Project (3GPP), allows deployment of a distributed core network and a disaggregated radio access network (RAN) architecture to support diverse use cases with vastly different service level agreements (SLAs). Support for these diverse use cases is achieved through network slicing (e.g., the creation of logical network instances customized to support the SLAs).

BRIEF DESCRIPTION OF THE DRAWINGS

FIGS. 1A-1G are diagrams of an example implementation described herein.

DETAILED DESCRIPTION OF PREFERRED EMBODIMENTS

The following detailed description of example implementations refers to the accompanying drawings. The same reference numbers in different drawings can identify the same or similar elements.

The architecture for a 5G network creates multiple technical problems associated with network management. For example, the architecture does not achieve optimal resource utilization when resources are split across multiple network slices, does not provide network management flexibility for resizing and/or rebalancing of network slices (e.g., network slice breathing), does not guarantee satisfying network slice SLAs before network slices are created, does not guarantee satisfying network slice SLAs after network slices are created, and/or the like.

Some implementations described herein provide a device (e.g., a network function) that utilizes machine learning to provide closed-loop network management of a 5G network. For example, the device can receive analytics data associated with management of a network associated with the device, core data associated with a core domain of the network, edge data associated with an edge domain of the network, and radio access network (RAN) data for a RAN associated with the network. The device can process the analytics data (e.g., from the core domain, edge domain, and the RAN), the core data, the edge data, and the RAN data, with domain-specific machine learning models, to determine one or more actions that are to be performed with respect to one or more of the core domain of the network, the edge domain of the network, and/or the RAN. The device can cause the one or more actions to be performed by one or more core devices associated with the core domain of the network, one or more edge devices associated with the edge domain of the network, and/or one or more RAN devices associated with the RAN.

In this way, the device provides a hierarchical architecture that supports closed-loop actions within each domain of a network and a RAN associated with the network. The device provides optimal resource utilization when network resources are split across multiple network slices, and provides network management flexibility for resizing and/or rebalancing of network slices, which conserves resources (e.g., processing resources, memory resources, and/or the like) that would otherwise be wasted in attempting to provide and manage network slices. Furthermore, the device satisfies network slice SLAs before and after network slices are created and provides hierarchical closed loops to ensure that SLAs of underlying network slices are satisfied.

Figure 1A:
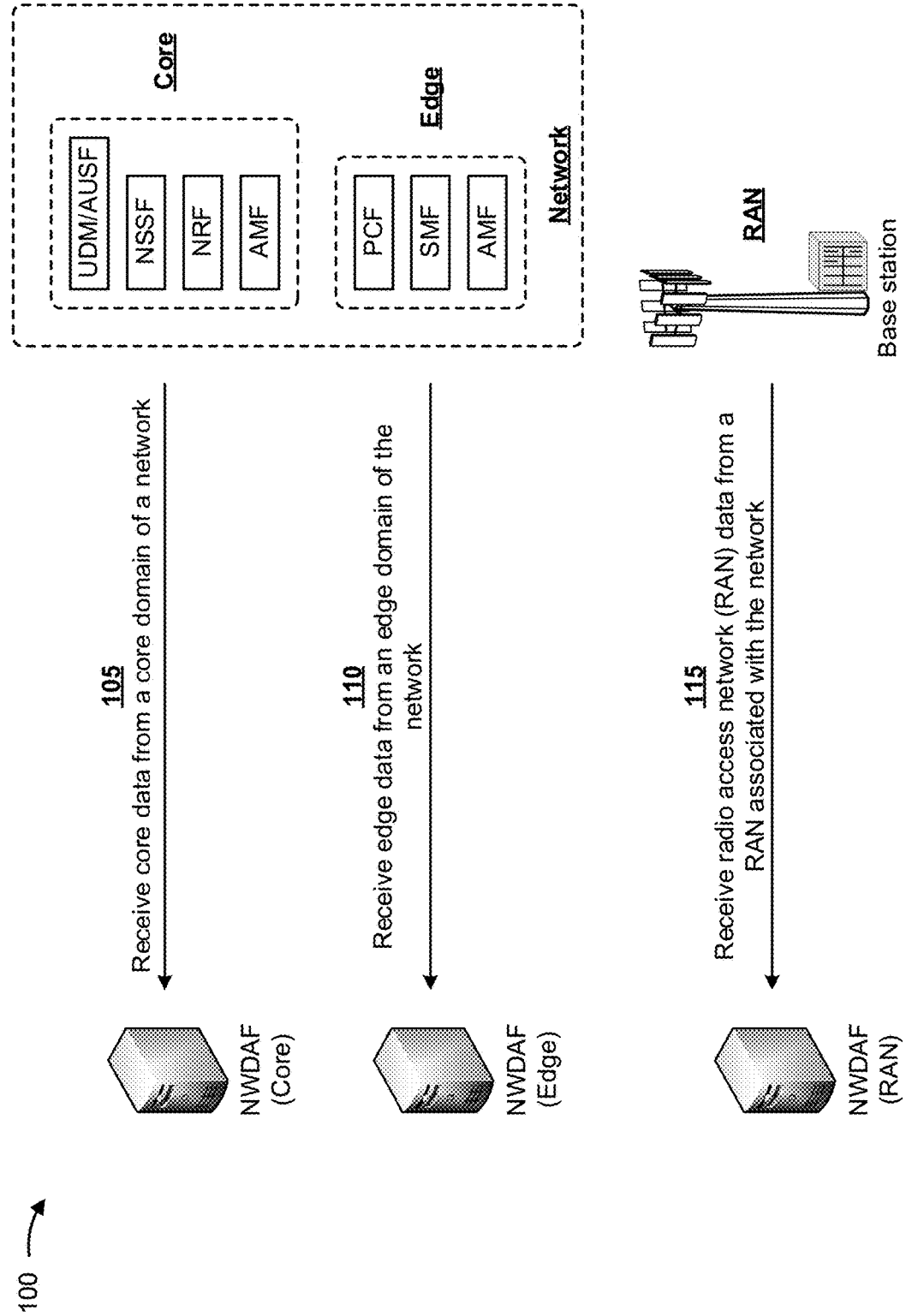

FIGS. 1A-1G are diagrams of an example implementation 100 described herein. As shown in FIG. 1A, devices, such as network data analytics function (NWDAF) devices, can be associated with a network (e.g., that includes a core domain and an edge domain) and with a radio-access network (RAN). The NWDAF device associated with the core domain of the network can be designated as the core NWDAF device, the NWDAF device associated with the edge domain of the network can be designated as the edge NWDAF device, and the NWDAF device associated with the RAN can be designated as the RAN NWDAF device. In some implementations, the single NWDAF device may be associated with the core domain, the edge domain, and the RAN, rather than having a dedicated NWDAF device for each domain.

Although implementations described herein refer to NWDAF devices, in some implementations, one or more of the NWDAF devices can be replaced with one or more self-organizing network (SON) devices. A SON device can provide lifecycle management, placement, and/or configuration of network resources; can scale up or down network resources; can provide coverage and capacity optimization for the network; can provide mobility robustness for the network; can provide anomaly detection, diagnosis, and/or healing for the network; can provide automatic neighbor relation setup for the network; can provide resource identifier allocation for the network; and/or the like. In some implementations, the features of an NWDAF device and the features of a SON device can be combined into a single device that can be associated with the core domain, the edge domain, and/or the RAN. In some implementations, the NWDAF device and the SON device may address two different roles in a network. For example, the NWDAF device may handle control plane aspects associated with user devices (e.g., per session and such as resource tuning). The SON device may handle network level configuration aspects. The NWDAF device may trigger network function placement options through other network functions, such as a network slice selection function (NSSF), a policy control function (PCF), and/or the like. The SON device may not trigger network function placement.

As further shown in FIG. 1A, the core domain of the network can include one or more core devices, such as a unified data management (UDM) device, an authentication server function (AUSF) device, a network slice selection function (NSSF) device, a policy control function (PCF) device, a network function repository function (NRF) device, an access and mobility management function (AMF) device, and/or the like. The edge domain of the network can include one or more edge devices, such as a PCF device, a session management function (SMF) device, an AMF device, and/or the like. The RAN can include one or more RAN devices, such as a base station, an eNodeB (eNB), a gNodeB (gNB), a common public radio interface (CPRI), an eCPRT, and/or the like.

As further shown in FIG. 1A, and by reference number 105, the core NWDAF device can receive core data from the one or more core devices of the core domain (e.g., in real time, near-real time, periodically, and/or the like). In some implementations, the core data can include subscriber data and profiles stored by a UDM device of the core domain; data utilized by a UDM device of the core domain for fixed access, mobile access, and/or the like, in the network; data utilized by an AUSF device of the core domain to provide authentication services and to support authentication of user devices associated with the network; data utilized by an NSSF device of the core domain to select network slices and to customize each network slice for different services; data utilized by a PCF device of the core domain to provide a policy framework that incorporates network slicing, roaming, packet processing, mobility management, and/or the like; data utilized by an NRF device of the core domain to support a service discovery function of the network; data utilized by an AMF device of the core domain to enable the AMF device to act as a termination point for non-access stratum (NAS) signaling, mobility management, etc.; and/or the like.

As further shown in FIG. 1A, and by reference number 110, the edge NWDAF device can receive edge data from the one or more edge devices of the edge domain (e.g., in real time, near-real time, periodically, and/or the like). In some implementations, the edge data can include data utilized by a PCF device of the edge domain to provide a policy framework that incorporates network slicing, roaming, packet processing, mobility management, and/or the like; data utilized by an SMF device of the edge domain to support the establishment, modification, and release of communications sessions in the network; data utilized by a UPF device of the edge domain to enable the UPF to serve as an anchor point for intraRAT and/or interRAT mobility; data utilized by a UPF device of the edge domain to apply rules to packets, such as rules pertaining to packet routing, traffic reporting, handling user plane quality of service, etc.; and/or the like.

As further shown in FIG. 1A, and by reference number 115, the RAN NWDAF device can receive RAN data from centralized and distributed components (e.g., the one or more RAN devices) of the RAN (e.g., in real time, near-real time, periodically, and/or the like). In some implementations, the RAN data can include data utilized by a base station of the RAN to provide one or more cells that cover geographic areas; data utilized by a base station of the RAN to perform scheduling and/or resource management for user devices covered by the base station; data indicating subscriber usage patterns in the RAN; data indicating mobility patterns in the RAN at network slice level and/or a RAN level; data indicating temporal and/or geographic traffic patterns (e.g., at a network slice level and at a RAN level); data indicating user device mix, characteristics, etc.; and/or the like.

In some implementations, the access technologies provided by the network can include 5G long-term evolution (LTE), 5G new radio (NR) frequency range 1 (FR1), 5G NR FR2, narrowband Internet of Things (NB-IoT), and/or the like. In some implementations, the services provided by the network can include a 5G gigabyte network, a 5G low latency network, and/or the like. In some implementations, the network capabilities provided by the network can include infrastructure as a service (IaaS), platform as a service (PaaS), network as a service (NaaS), an industrial IoT-enabled platform, a general purpose enhanced mobile broadband (eMBB) infrastructure, a vehicle-to-everything (V2X) network, and/or the like.

Figure 1B:
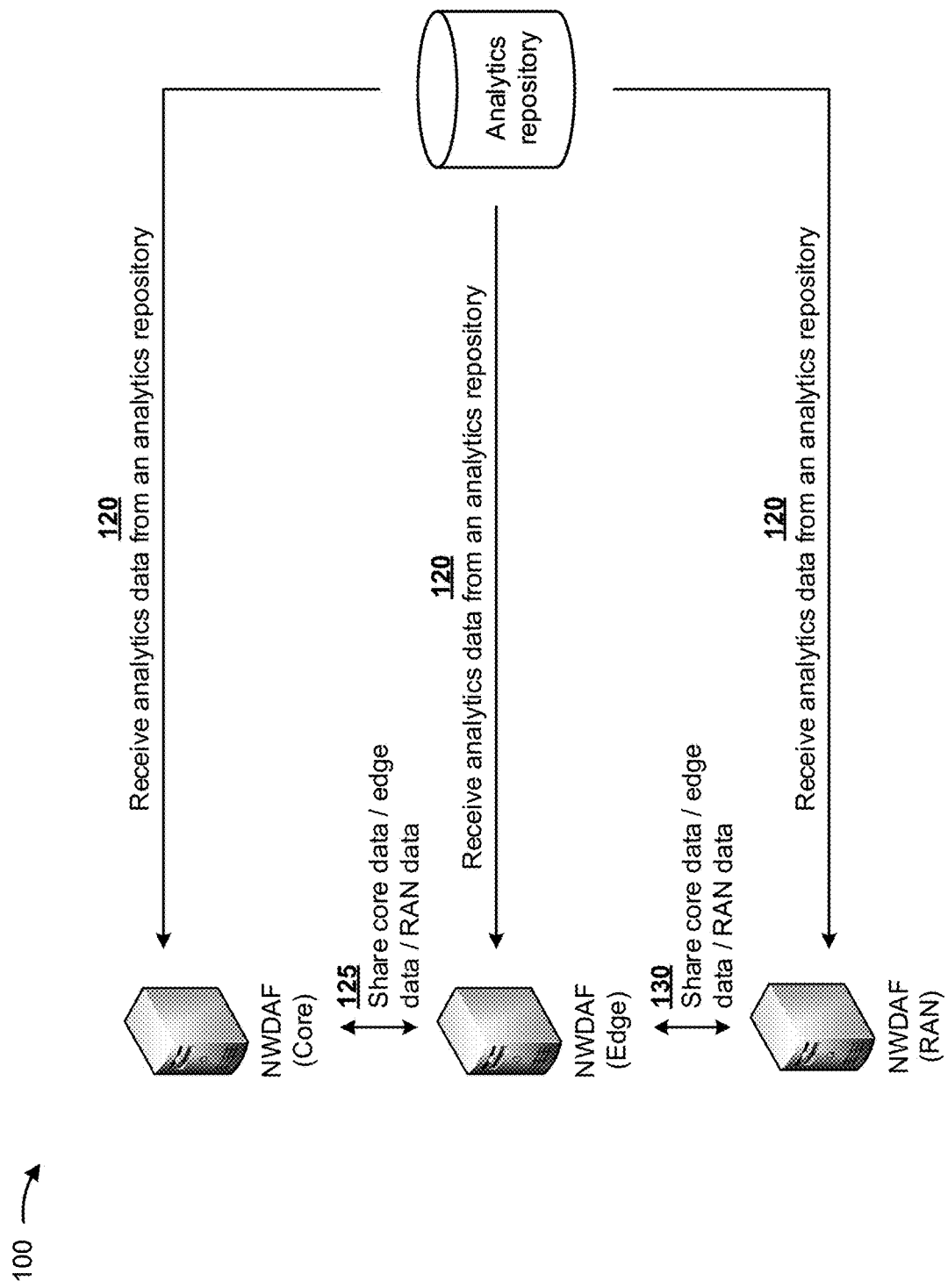

As shown in FIG. 1B, and by reference number 120, the core NWDAF device, the edge NWDAF device, and the RAN NWDAF device can receive analytics data from an analytics repository (e.g., in real time, near-real time, periodically, and/or the like). In some implementations, the analytics data can include data identifying trends and/or patterns associated with the network; data indicating bit rates through network resources; data indicating collision and packet drop rates associated with the network; data indicating latencies associated with the network; data indicating packets affected by security policies; flow data associated with the network; security data associated with the network; interpreted packet flows from the network; log data from the network; time-series monitoring data associated with the network; synthetic network data; and/or the like.

As further shown in FIG. 1B, and by reference number 125, the core NWDAF device and the edge NWDAF device can share the core data, the edge data, and/or the RAN data. For example, the core NWDAF device can provide the core data (e.g., received from the core domain of the network) to the edge NWDAF device. The edge NWDAF device can provide the edge data (e.g., received from the edge domain of the network), and the RAN data (e.g., received from the RAN NWDAF device), to the core NWDAF device.

As further shown in FIG. 1B, and by reference number 130, the edge NWDAF device and the RAN NWDAF device can share the core data, the edge data, and/or the RAN data. For example, the edge NWDAF device can provide the edge data (e.g., received from the edge domain of the network), and the core data (e.g., received from the core NWDAF device), to the RAN NWDAF device. The RAN NWDAF device can provide the RAN data (e.g., received from the RAN) to the edge NWDAF device.

Figure 1C:
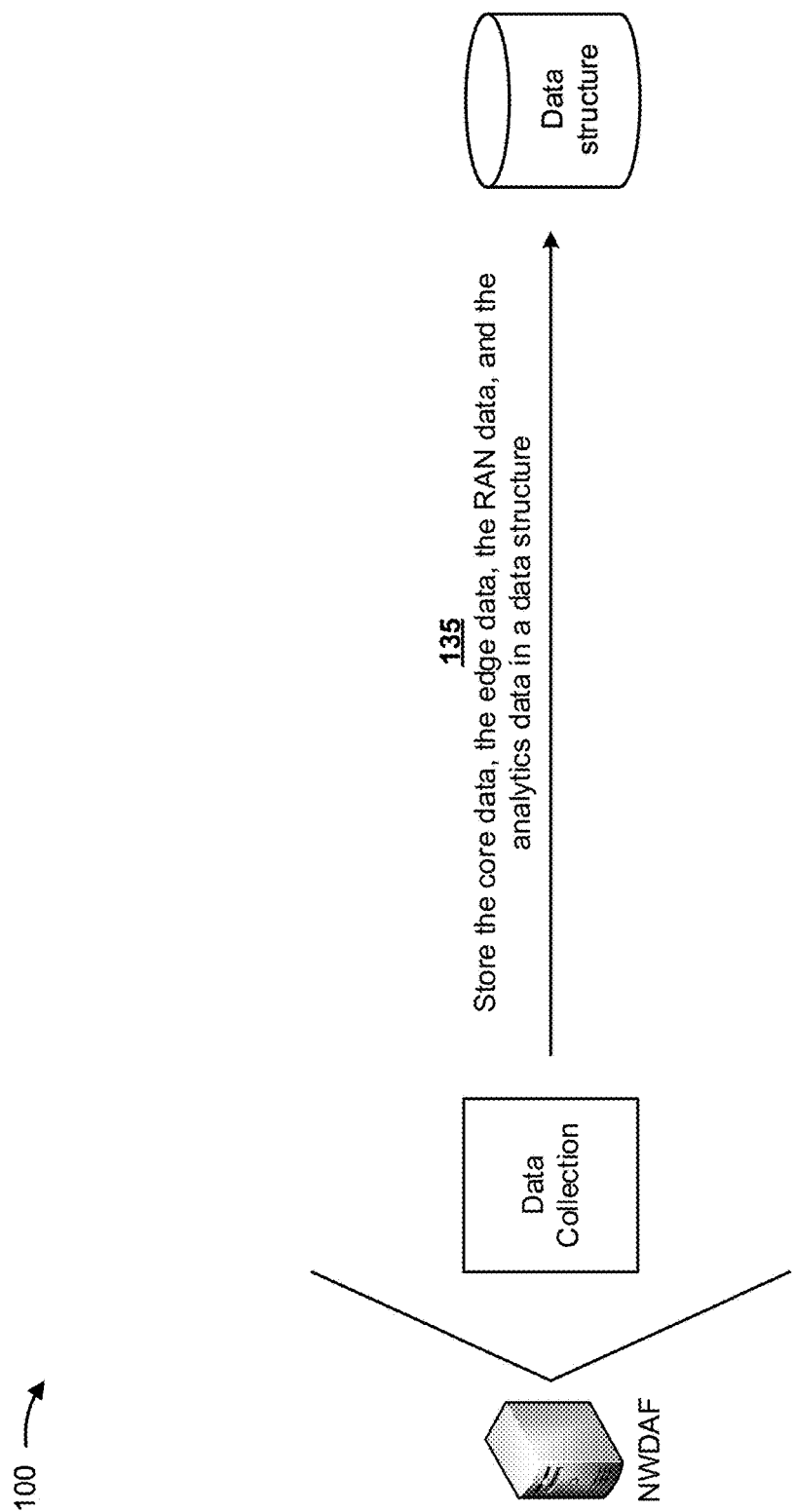

As shown in FIG. 1C, and by reference number 135, the NWDAF device (e.g., the core NWDAF device, the edge NWDAF device, and/or the RAN NWDAF device) can store the core data, the edge data, the RAN data and/or the analytics data in a data structure (e.g., a data repository, a database, a table, a list, and/or the like) associated with the NWDAF device. In some implementations, the NWDAF device can store the core data, the edge data, the RAN data and/or the analytics data in the data structure in real time. In this way, the NWDAF device can utilize real-time data to determine closed-loop network management data for the network in real time.

As shown in FIG. 1D, and by reference number 140, the NWDAF device (e.g., the core NWDAF device, the edge NWDAF device, and/or the RAN NWDAF device) can process the core data, the edge data, the RAN data, and/or the analytics data, with a machine learning model, to determine one or more actions to perform in the core domain of the network, the edge domain of the network, and/or the RAN. In some implementations, the one or more actions can include one or more actions described below in connection with FIGS. 1E-1G. In some implementations, the machine learning model can include a deep learning model, a linear regression model, a naïve Bayesian model, and/or one or more combinations of the aforementioned or other suitable models.

In some implementations, the NWDAF device can perform a training operation on the machine learning model with historical data. In some implementations, the historical data can include: historical core data associated with networks; historical edge data associated with the networks; historical RAN data for RANs associated with the networks; historical analytics data associated with the networks; information indicating historical actions performed by the core domains of the networks, edge domains of the networks, and/or the RANs based on the historical core data, the historical edge data, the historical RAN data, and/or the historical analytics data. In some implementations, the NWDAF device can separate the historical data into a training set, a validation set, a test set, and/or the like. The training set can be utilized to train the machine learning model. The validation set can be utilized to validate results of the trained machine learning model. The test set can be utilized to test operation of the machine learning model.

In some implementations, the NWDAF device can train the machine learning model using, for example, an unsupervised training procedure and based on the training set of the historical data. For example, the NWDAF device can perform dimensionality reduction to reduce the historical data to a minimum feature set, thereby reducing resources (e.g., processing resources, memory resources, and/or the like) used to train the machine learning model, and can apply a classification technique to the minimum feature set.

In some implementations, the NWDAF device can use a logistic regression classification technique to determine a categorical outcome (e.g., information indicating one or more actions performed in the networks and/or the RANs). Additionally, or alternatively, the NWDAF device can use a naïve Bayesian classifier technique. In this case, the NWDAF device can perform binary recursive partitioning to split the historical data into partitions and/or branches and use the partitions and/or branches to perform predictions (e.g., information indicating one or more actions performed in the networks and/or the RANs). Based on using recursive partitioning, the NWDAF device can reduce utilization of computing resources relative to manual, linear sorting and analysis of data points, thereby enabling use of thousands, millions, or billions of data points to train the machine learning model, which can result in a more accurate model than using fewer data points.

Additionally, or alternatively, the NWDAF device can use a support vector machine (SVM) classifier technique to generate a non-linear boundary between data points in the training set. In this case, the non-linear boundary is used to classify test data into a particular class.

Additionally, or alternatively, the NWDAF device can train the machine learning model using a supervised training procedure that includes receiving input to the machine learning model from a subject matter expert, which can reduce an amount of time, an amount of processing resources, and/or the like to train the machine learning model of activity automatability, relative to an unsupervised training procedure. In some implementations, the NWDAF device can use one or more other model training techniques, such as a neural network technique, a latent semantic indexing technique, and/or the like. For example, the NWDAF device can perform an artificial neural network processing technique (e.g., using a two-layer feedforward neural network architecture, a three-layer feedforward neural network architecture, and/or the like) to perform pattern recognition with regard to particular insights indicated in the historical data. In this case, using the artificial neural network processing technique can improve an accuracy of the trained machine learning model generated by the NWDAF device by being more robust to noisy, imprecise, or incomplete data, and by enabling the NWDAF device to detect patterns and/or trends undetectable to human analysts or systems using less complex techniques.

In some implementations, the NWDAF device can receive the trained machine learning model from another source. In such implementations, the trained machine learning model can be trained as described above.

Figure 1E:
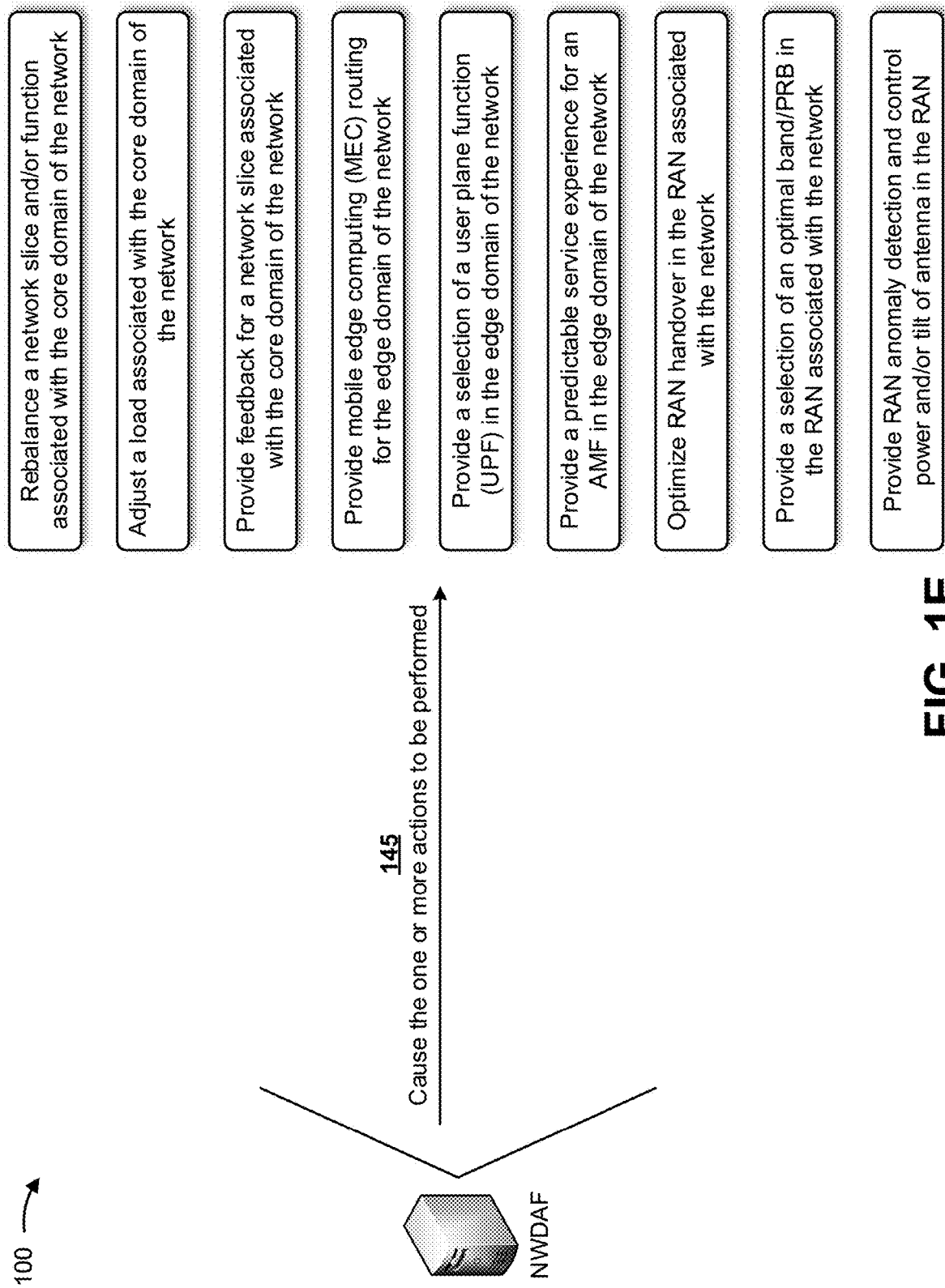

As shown in FIG. 1E, and by reference number 145, the NWDAF device can cause one or more actions to be performed in the core domain of the network, the edge domain of the network, and/or the RAN. In some implementations, causing the one or more actions to be performed can include causing one or more core devices to rebalance a network slice and/or a network function associated with the network. In this way, the NWDAF device can ensure that network resources are properly allocated for the network slice and/or the network function, which can conserve network resources that would otherwise be wasted in an unbalanced network slice and/or an unbalanced network function.

In some implementations, causing the one or more actions to be performed can include causing one or more core devices to adjust a load associated with the core domain. In this way, the NWDAF device can conserve resources that would otherwise be underutilized in the core domain of the network.

In some implementations, causing the one or more actions to be performed can include causing one or more core devices to provide feedback for design of a network slice and/or for service level agreement guarantees by translating the SLA into network resource requirements and verifying them against current network resource availability. In this way, the NWDAF device can ensure that the design of the network slice is correct and/or that the service level agreement is guaranteed.

In some implementations, causing the one or more actions to be performed can include causing one or more edge devices to provide mobile edge computing (MEC) routing for the edge domain. In this way, the NWDAF device can enable cloud-computing capabilities and an information technology (IT) service environment at the edge domain of the network.

In some implementations, causing the one or more actions to be performed can include causing one or more edge devices to select a user plane function (UPF) associated with the edge domain of the network. In this way, the NWDAF device can enable UPF selection, which enables mobile edge computing (MEC) by selecting a UPF close to the edge of the network.

In some implementations, causing the one or more actions to be performed can include causing one or more edge devices to provide a particular service experience. In this way, the NWDAF device can ensure provision of a predictable service experience by the one or more edge devices.

In some implementations, causing the one or more actions to be performed can include causing one or more RAN devices to optimize RAN handover for the RAN. In this way, the NWDAF device can optimize RAN handover, which can conserve resources that would otherwise be wasted in providing the RAN handover.

In some implementations, causing the one or more actions to be performed can include causing one or more RAN devices to select a particular band and/or a particular physical resource block (PRB) for the RAN. In this way, the NWDAF device can enable selection of an optimal band and/or PRB for the RAN, which can conserve resources that would otherwise be wasted in utilizing a sub-optimal band and/or PRB.

In some implementations, causing the one or more actions to be performed can include causing one or more RAN devices to provide a RAN anomaly detection service. In this way, the NWDAF device can enable detection of anomalies associated with the RAN, which can aid in troubleshooting such anomalies.

In some implementations, causing the one or more actions to be performed can include causing one or more RAN devices to control power provided to an antenna associated with the RAN. In this way, the NWDAF device can conserve resources that would otherwise be wasted in providing too much power to the antenna.

In some implementations, causing the one or more actions to be performed can include causing one or more RAN devices to control a tilt of the antenna. In this way, the NWDAF device (e.g., a SON device) can enable control of the tilt of the antenna, which can conserve resources that would otherwise be wasted with an improperly tilted antenna.

In some implementations, causing the one or more actions to be performed can include providing a predictable service experience for the RAN per network slice per quality of service (QoS) flow, rebalancing a network slice and/or a network function associated with the RAN, providing information to a self-organizing network mechanism or a radio controller to control the RAN, and/or the like.

Figure 1F:
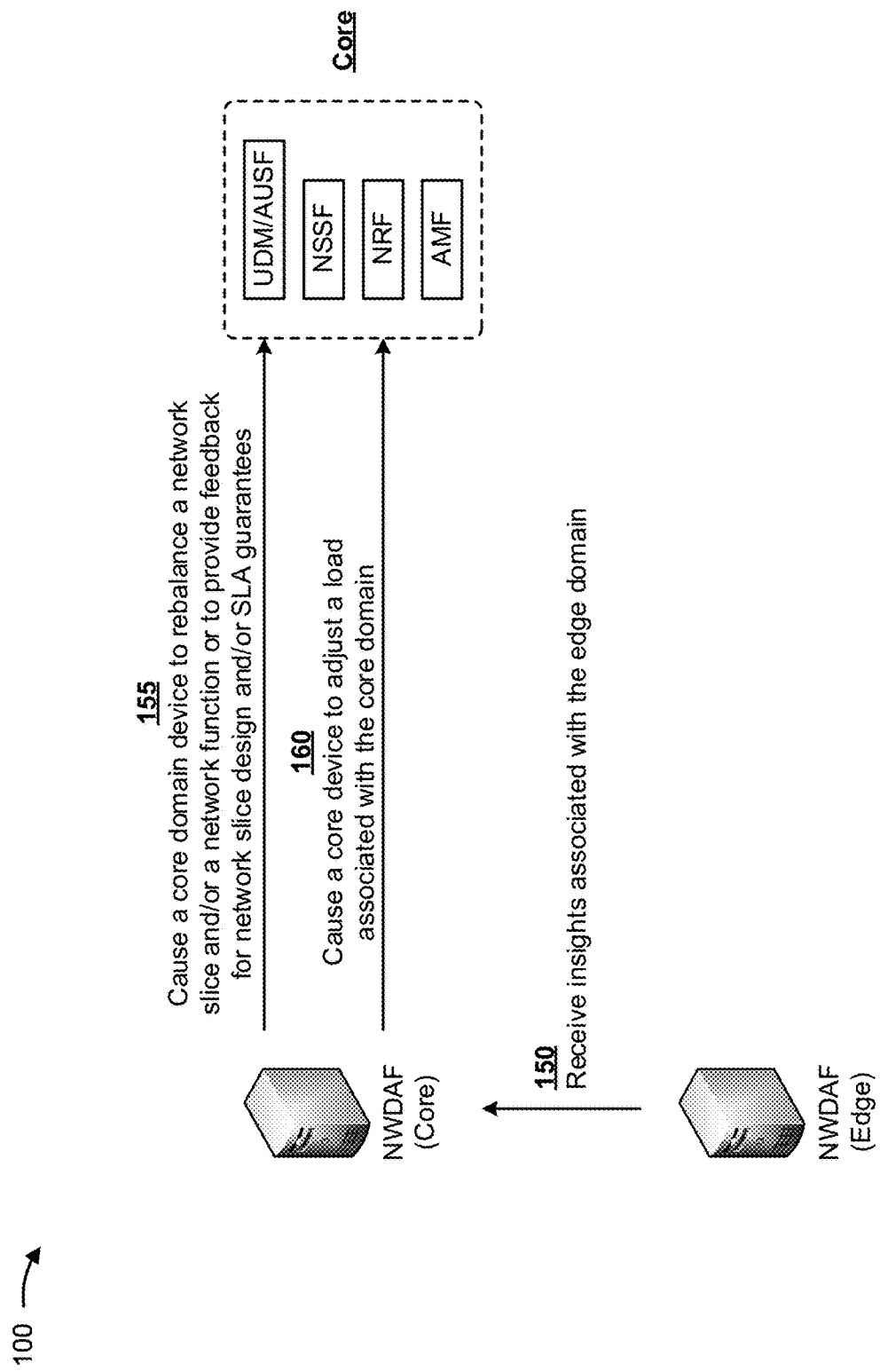

As shown in FIG. 1F, and by reference number 150, the core NWDAF device can receive insights associated with the edge domain from the edge NWDAF device. In some implementations, the insights can include information indicating one or more actions that were caused to be performed at the edge domain of the network by the edge NWDAF device, information indicating one or more actions to be performed at the core domain of the network, and/or the like.

As further shown in FIG. 1F, and by reference number 155, the core NWDAF device can cause one or more core domain devices to rebalance a network slice and/or a network function associated with the network. In this way, the one or more core domain devices can ensure that network resources are properly allocated for the network slice and/or the network function. As further shown in FIG. 1F, and by reference number 155, the core NWDAF device can cause the one or more core domain devices to provide feedback for design of a network slice and/or for service level agreement guarantees. In this way, the one or more core domain devices can ensure that the design of the network slice is correct and/or that the service level agreement is guaranteed.

As further shown in FIG. 1F, and by reference number 160, the core NWDAF device can cause the NSSF device, the NRF device, and/or the AMF device of the core domain to adjust a current load by recommending a percentage of load reduction associated with the core domain. In this way, the NSSF device, the NRF device, and/or the AMF device can conserve resources that would otherwise be underutilized in the core domain of the network.

Figure 1G:
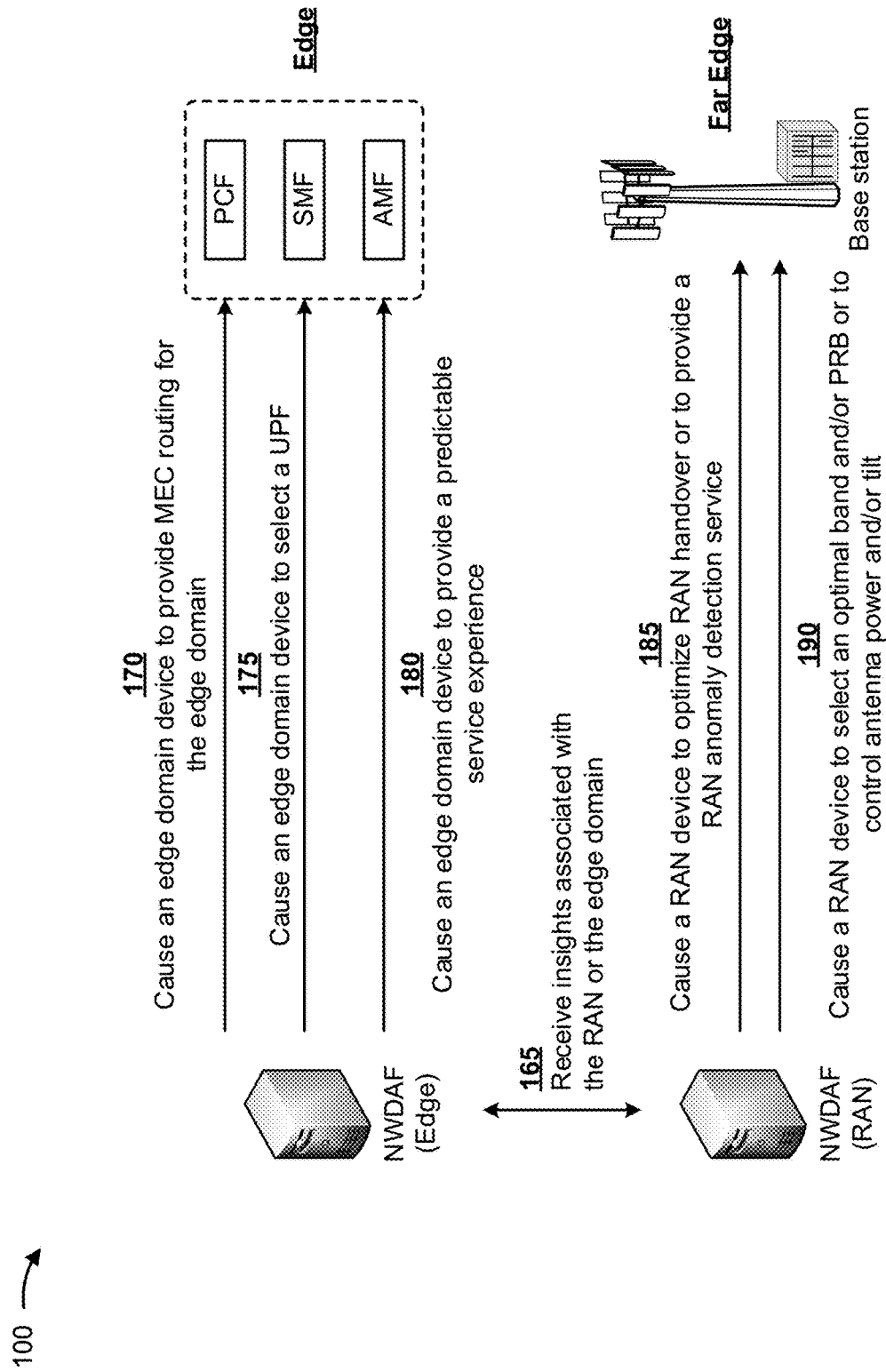

As shown in FIG. 1G, and by reference number 165, the edge NWDAF device can receive insights associated with the RAN from the RAN NWDAF device. In some implementations, the insights can include information indicating one or more actions that were caused to be performed at the RAN by the RAN NWDAF device, information indicating one or more actions to be performed at the edge domain of the network, and/or the like. As further shown in FIG. 1G, and by reference number 165, the RAN NWDAF device can receive insights associated with the edge domain from the edge NWDAF device. In some implementations, the insights can include information indicating one or more actions that were caused to be performed at the edge domain by the edge NWDAF device, information indicating one or more actions to be performed at the RAN of the network, and/or the like.

As further shown in FIG. 1G, and by reference number 170, the edge NWDAF device can cause the PCF device of the edge domain to provide mobile edge computing (MEC) routing for the edge domain. In this way, the PCF device can enable cloud-computing capabilities and an information technology (IT) service environment at the edge domain of the network.

As further shown in FIG. 1G, and by reference number 175, the edge NWDAF device can cause the SMF device of the edge domain to select a user plane function (UPF) associated with the edge domain of the network, taking factors such as UE/application behavior and edge computing load into consideration. In this way, the SMF device can enable UPF selection, which enables mobile edge computing (MEC) by selecting a UPF close to the edge of the network.

As further shown in FIG. 1G, and by reference number 180, the edge NWDAF device can cause the AMF device of the edge domain to provide a particular service experience. In this way, the AMF device can ensure provision of a predictable service experience.

As further shown in FIG. 1G, and by reference number 185, the RAN NWDAF device can cause the base station of the RAN to optimize RAN handover for the RAN based on predictive modeling of UE behavior. In this way, the base station can optimize RAN handover, which can conserve resources that would otherwise be wasted in providing the RAN handover. As further shown in FIG. 1G, and by reference number 185, the RAN NWDAF device can cause the base station of the RAN to provide a RAN anomaly detection service. In this way, the base station can enable detection of anomalies associated with the RAN, which can aid in troubleshooting such anomalies.

As further shown in FIG. 1G, and by reference number 190, the RAN NWDAF device can cause the base station of the RAN to select a particular band and/or a particular physical resource block (PRB) for the RAN. In this way, the base station can enable selection of an optimal band and/or PRB for the RAN, which can conserve resources that would otherwise be wasted in utilizing a sub-optimal band and/or PRB. As further shown in FIG. 1G, and by reference number 190, the RAN NWDAF device can cause the base station of the RAN to control power provided to and/or a tilt of an antenna associated with the RAN. In this way, the base station can conserve resources that would otherwise be wasted in providing too much power to the antenna and/or with an improperly tilted antenna.

In this way, several different stages of the process for providing closed-loop network management of a 5G network are automated via machine learning, which can remove human subjectivity and waste from the process, and which can improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes machine learning to provide closed-loop network management of a 5G network. Finally, automating the process for providing closed-loop network management of a 5G network conserves computing resources (e.g., processing resources, memory resources, and/or the like) that would otherwise be wasted in attempting to manage a 5G network.

As indicated above, FIGS. 1A-1G are provided merely as examples. Other examples can differ from what is described with regard to FIGS. 1A-1G. The number and arrangement of devices and networks shown in FIGS. 1A-1G also are provided as an example. In practice, there can be additional devices and/or networks, fewer devices and/or networks, different devices and/or networks, or differently arranged devices and/or networks than those shown in FIGS. 1A-1G. Furthermore, two or more devices shown in FIGS. 1A-1G can be implemented within a single device, or a single device shown in FIGS. 1A-1G can be implemented as multiple, distributed devices. Additionally, or alternatively, a set of devices (e.g., one or more devices) of FIGS. 1A-1G can perform one or more functions described as being performed by another set of devices of FIGS. 1A-1G.

Figure 2:
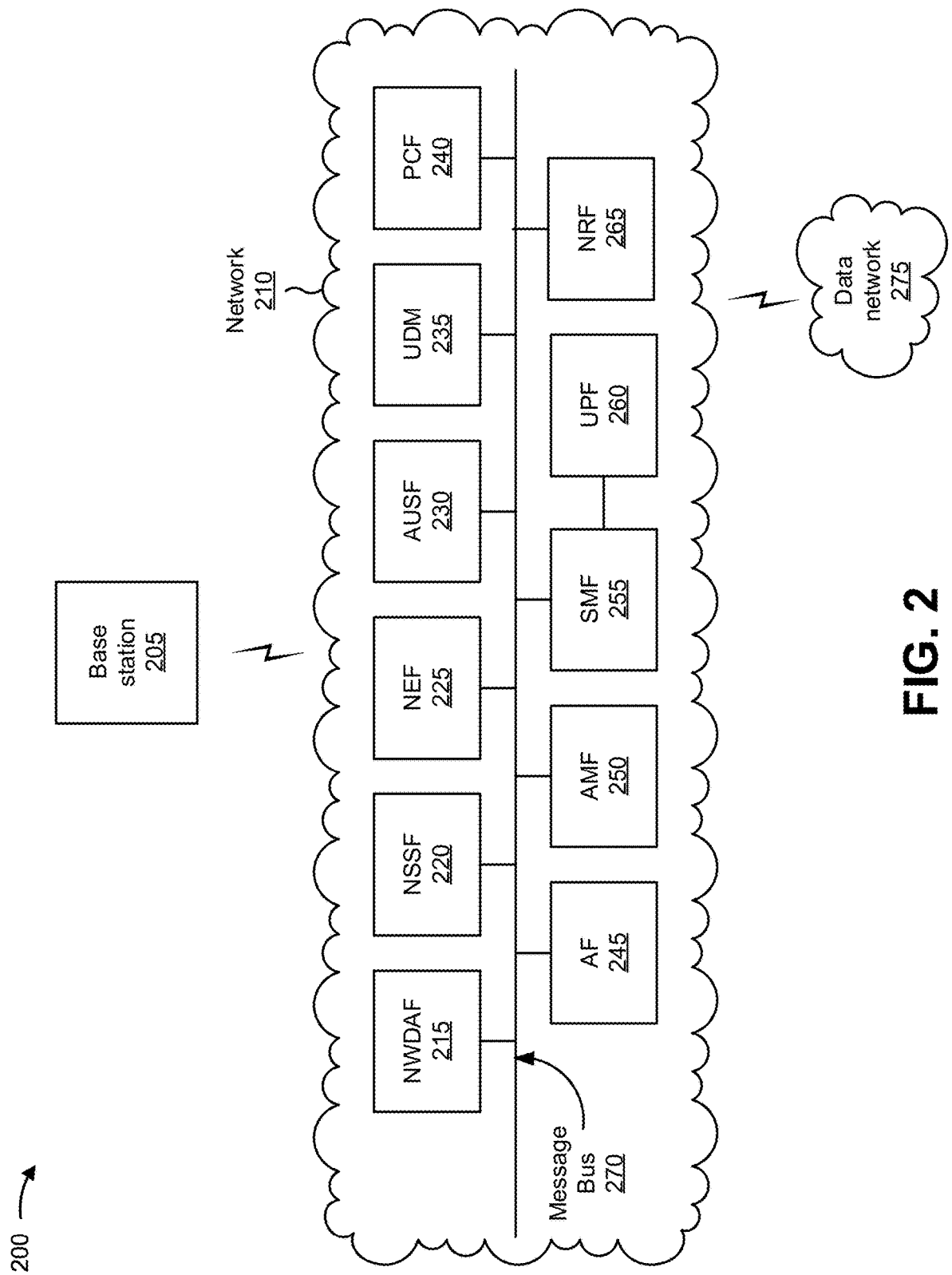
FIG. 2 is a diagram of an example environment in which systems and/or methods described herein can be implemented.

FIG. 2 is a diagram of an example environment 200 in which systems and/or methods, described herein, can be implemented. As shown in FIG. 2, example environment 200 can include a base station 205, a network 210, and a data network 275. Devices and/or networks of example environment 200 can interconnect via wired connections, wireless connections, or a combination of wired and wireless connections.

Base station 205 includes one or more devices capable of communicating with a user device (e.g., a user equipment (UE)) using a cellular radio access technology (RAT). For example, base station 205 can include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 205 can transfer traffic between the user device (e.g., using a cellular RAT), other base stations 205 (e.g., using a wireless interface or a backhaul interface, such as a wired backhaul interface), and/or network 210. Base station 205 can provide one or more cells that cover geographic areas. Some base stations 205 can be mobile base stations. Some base stations 205 can communicate using multiple RATs.

In some implementations, base station 205 can perform scheduling and/or resource management for user devices covered by base station 205 (e.g., user devices covered by a cell provided by base station 205). In some implementations, base station 205 can be controlled or coordinated by a network controller, which can perform load balancing, network-level configuration, and/or the like. The network controller can communicate with base station 205 via a wireless or wireline backhaul. In some implementations, base station 205 can include a network controller, a self-organizing network (SON) module or component, or a similar module or component. In other words, base station 205 can perform network control, scheduling, and/or network management functions (e.g., for other base stations 205 and/or for uplink, downlink, and/or sidelink communications of user devices covered by the base station 205). In some implementations, base station 205 can include a central unit and multiple distributed units. The central unit can coordinate access control and communication with regard to the multiple distributed units. The multiple distributed units can provide user devices and/or other base stations 205 with access to data network 275 via the core network.

In some implementations, network 210 can include an example functional architecture in which systems and/or methods described herein can be implemented. For example, network 210 can include an example architecture of a 5G next generation (NG) core network included in a 5G wireless telecommunications system. While the example architecture of network 210 shown in FIG. 2 can be an example of a service-based architecture, in some implementations, network 210 can be implemented as a reference-point architecture.

As shown in FIG. 2, network 210 can include a number of functional elements. The functional elements can include, for example, a network data analytics function (NWDAF) 215, a network slice selection function (NSSF) 220, a network exposure function (NEF) 225, an authentication server function (AUSF) 230, a unified data management (UDM) component 235, a policy control function (PCF) 240, an application function (AF) 245, an access and mobility management function (AMF) 250, a session management function (SMF) 255, a user plane function (UPF) 260, a network function repository function (NRF) 265, and/or the like. These functional elements can be communicatively connected via a message bus 270. Each of the functional elements shown in FIG. 2 can be implemented on one or more devices associated with a wireless telecommunications system. In some implementations, one or more of the functional elements can be implemented on physical devices, such as an access point, a base station, a gateway, and/or the like. In some implementations, one or more of the functional elements can be implemented on a computing device of a cloud computing environment.

NWDAF 215 includes one or more devices that provide network analysis information upon request from network functions of network 210. For example, a network function can request, from NWDAF 215, specific analysis information on a load level associated with a network slice. Alternatively, the network function can use a subscribe service to ensure that the network function is notified by NWDAF 215 if the load level of a network slice changes or reaches a specific threshold.

In some implementations, NWDAF 215 can include a hybrid architecture that provides rule-driven and/or real-time data-driven insights for network 210 (e.g., for local domain closed loop actions). In some implementations, NWDAF 215 can ensure that there are no race conditions between domains of network 210, which can ensure system stability, and can share data and insights with other NWDAFs 215 for fine tuning of network 210. In some implementations, NWDAF 215 can process data for each domain of network 210, with models, to determine actions to perform for each domain.

NSSF 220 includes one or more devices that select network slice instances for a user device. By providing network slicing, NSSF 220 allows an operator to deploy multiple substantially independent end-to-end networks potentially within the same infrastructure. In some implementations, each slice can be customized for different services.

NEF 225 includes one or more devices that support exposure of capabilities and/or events in the wireless telecommunications system to help other entities in the wireless telecommunications system discover network services.

AUSF 230 includes one or more devices that act as an authentication server and support the process of authenticating user devices in the wireless telecommunications system.

UDM 235 includes one or more devices that store subscriber data and profiles in the wireless telecommunications system. UDM 235 can be used for fixed access, mobile access, and/or the like, in network 210.

PCF 240 includes one or more devices that provide a policy framework that incorporates network slicing, roaming, packet processing, mobility management, and/or the like.

AF 245 includes one or more devices that support application influence on traffic routing, access to NEF 225, policy control, and/or the like.

AMF 250 includes one or more devices that act as a termination point for non-access stratum (NAS) signaling, mobility management, and/or the like.

SMF 255 includes one or more devices that support the establishment, modification, and release of communications sessions in the wireless telecommunications system. For example, SMF 255 can configure traffic steering policies at UPF 260, enforce user device IP address allocation and policies, and/or the like.

UPF 260 includes one or more devices that serve as an anchor point for intraRAT and/or interRAT mobility. UPF 260 can apply rules to packets, such as rules pertaining to packet routing, traffic reporting, handling user plane QoS, and/or the like.

NRF 265 includes one or more devices that support a service discovery function of network 210. NRF 265 can receive a network function (NF) discovery request from a network function and can provide information about discovered network functions.

Message bus 270 represents a communication structure for communication among the functional elements. In other words, message bus 270 can permit communication between two or more functional elements.

Data network 275 includes one or more wired and/or wireless data networks. For example, data network 275 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of example environment 200 can perform one or more functions described as being performed by another set of devices of example environment 200.

Figure 3:
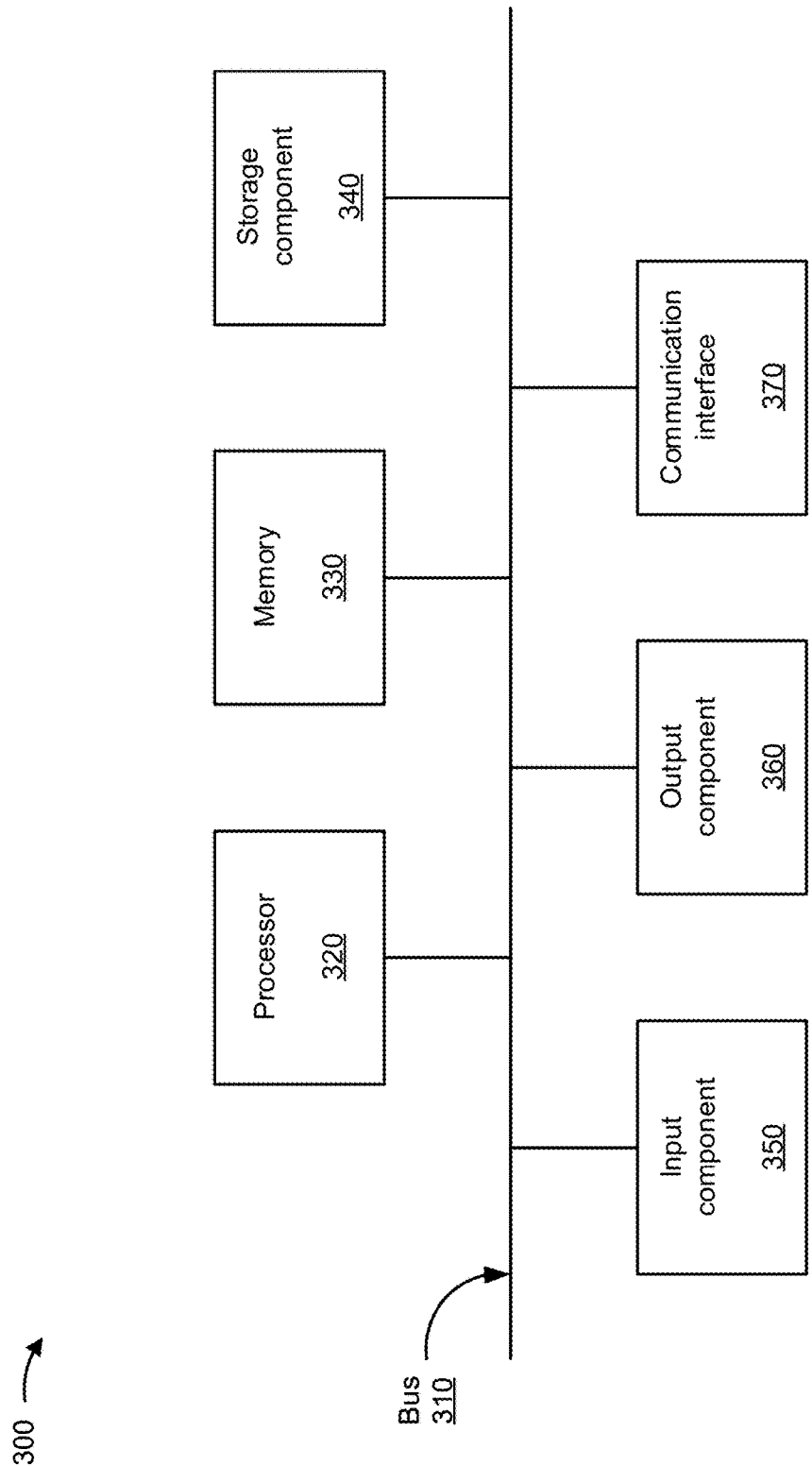
FIG. 3 is a diagram of example components of one or more devices of FIG. 2.

FIG. 3 is a diagram of example components of a device 300. Device 300 can correspond to base station 205, NWDAF 215, NSSF 220, NEF 225, AUSF 230, UDM 235, PCF 240, AF 245, AMF 250, SMF 255, UPF 260, and/or NRF 265. In some implementations, base station 205, NWDAF 215, NSSF 220, NEF 225, AUSF 230, UDM 235, PCF 240, AF 245, AMF 250, SMF 255, UPF 260, and/or NRF 265 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
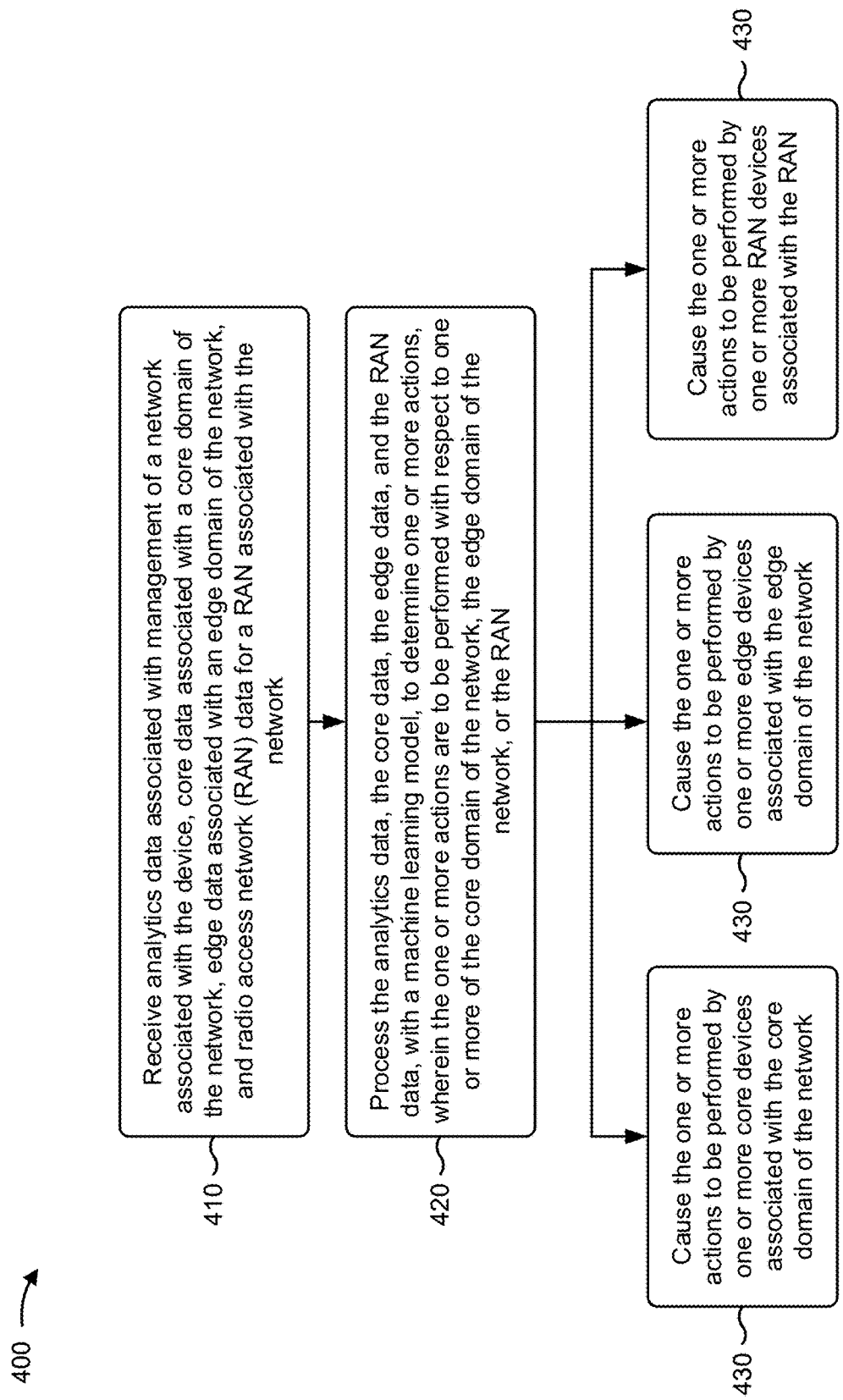
FIG. 4 is a flow chart of an example process for utilizing machine learning to provide closed-loop network management of a 5G network.

FIG. 4 is a flow chart of an example process 400 for utilizing machine learning to provide closed-loop network management of a 5G network. In some implementations, one or more process blocks of FIG. 4 can be performed by a device, such as an NWDAF (e.g., NWDAF 215). In some implementations, one or more process blocks of FIG. 4 can be performed by another device or a group of devices separate from or including the NWDAF, such as an NSSF (e.g., NSSF 220), an SMF (e.g., SMF 250), and/or a UPF (e.g., UPF 260).

As shown in FIG. 4, process 400 can include receiving analytics data associated with management of a network associated with the device, core data associated with a core domain of the network, edge data associated with an edge domain of the network, and radio access network (RAN) data for a RAN associated with the network (block 410). For example, the device (e.g., using processor 320, storage component 340, communication interface 370, and/or the like) can receive analytics data associated with management of the network, core data associated with a core domain of the network, edge data associated with an edge domain of the network, and radio access network (RAN) data for a RAN associated with the network, as described above in connection with FIGS. 1A-2.

As further shown in FIG. 4, process 400 can include processing the analytics data, the core data, the edge data, and the RAN data, with a machine learning model, to determine one or more actions, wherein the one or more actions are to be performed with respect to one or more of the core domain of the network, the edge domain of the network, or the RAN (block 420). For example, the device (e.g., using processor 320, memory 330, storage component 340, and/or the like) can process the analytics data, the core data, the edge data, and the RAN data, with a machine learning model, to determine one or more actions, as described above in connection with FIGS. 1A-2. In some implementations, the one or more actions can be performed with respect to one or more of the core domain of the network, the edge domain of the network, or the RAN.

As further shown in FIG. 4, process 400 can include causing the one or more actions to be performed by one or more core devices associated with the core domain of the network, one or more edge devices associated with the edge domain of the network, or one or more RAN devices associated with the RAN (block 430). For example, the device (e.g., using processor 320, storage component 340, communication interface 370, and/or the like) can cause the one or more actions to be performed by one or more core devices associated with the core domain of the network, one or more edge devices associated with the edge domain of the network, or one or more RAN devices associated with the RAN, as described above in connection with FIGS. 1A-2.

Process 400 can include additional implementations, such as any single implementation or any combination of implementations described below and/or described with regard to any other process described herein.

In some implementations, when causing the one or more actions to be performed, the device can cause the one or more core devices to rebalance a network slice and/or a network function associated with the network, can cause the one or more core devices to provide feedback for design of a network slice and/or for service level agreement guarantees, and/or can cause the one or more core devices to adjust a load associated with the core domain.

In some implementations, when causing the one or more actions to be performed, the device can cause the one or more edge devices to provide mobile edge computing (MEC) routing for the edge domain, can cause the one or more edge devices to select a user plane function (UPF) associated with the edge domain, and/or can cause the one or more edge devices to provide a particular service experience.

In some implementations, when causing the one or more actions to be performed, the device can cause the one or more RAN devices to optimize RAN handover for the RAN, can cause the one or more RAN devices to provide a RAN anomaly detection service, can cause the one or more RAN devices to select a particular band and/or a particular physical resource block (PRB) for the RAN, can cause the one or more RAN devices to control power provided to an antenna associated with the RAN, and/or can cause the one or more RAN devices to control a tilt of the antenna.

In some implementations, when the device is associated with the core domain, the device can provide the core data to a first management device associated with the edge domain. Additionally, when the device is associated with the edge domain, the device can provide the edge data to a second management device associated with the core domain and to a third management device associated with the RAN. Additionally, when the device is associated with the RAN, the device can provide the RAN data to the first management device associated with the edge domain.

In some implementations, the device can include one or more of a network data analytics function (NWDAF) device, or a self-organizing network (SON) device. Additionally, the one or more core devices can include one or more of a unified data management (UDM) device, an authentication server function (AUSF) device, a network slice selection function (NSSF) device, a policy control function (PCF) device, a network function repository function (NRF) device, or an access and mobility management function (AMF) device. Additionally, the one or more edge devices can include one or more of a PCF device, a session management function (SMF) device, or an AMF device. Additionally, the one or more RAN devices can include one or more of an eNodeB (eNB), a gNodeB (gNB), a common public radio interface (CPRI), or an eCPRI.

In some implementations, the core data, the edge data, and the RAN can be received in real time, and, when causing the one or more actions to be performed, the device can prevent race conditions between the core domain, the edge domain, and the RAN based on the core data, the edge data, and the RAN data.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device associated with a network:
        analytics data associated with management of the network,
        core data associated with a core domain of the network,
        edge data associated with an edge domain of the network, and
        radio access network (RAN) data for a RAN associated with the network;
    processing, by the device, the analytics data, the core data, the edge data, and the RAN data, with a machine learning model, to determine one or more actions, wherein the one or more actions are to be performed with respect to one or more of:
        the core domain of the network,
        the edge domain of the network, or
        the RAN;
    causing, by the device, one or more core devices associated with the core domain of the network to rebalance a network slice and/or a network function associated with the network;
    translating, by the device, service level agreements (SLAs) into network resource requirements;
    verifying, by the device, the network resource requirements against current network resource availability; and
    causing, by the device and based on verifying the network resource requirements, the one or more core devices to provide feedback for at least one of a design of a network slice or service level agreement guarantees.

2. The method of claim 1, further comprising:
    causing the one or more core devices to adjust a load associated with the core domain.

3. The method of claim 1, further comprising:
    causing one or more edge devices, associated with the edge domain of the network, to provide mobile edge computing (MEC) routing for the edge domain;
    causing the one or more edge devices to select a user plane function (UPF) associated with the edge domain; or
    causing the one or more edge devices to provide a particular service experience.

4. The method of claim 1, further comprising:
    causing one or more RAN devices, associated with the RAN, to optimize RAN handover for the RAN;
    causing the one or more RAN devices to provide a RAN anomaly detection service;
    causing the one or more RAN devices to select a particular band and/or a particular physical resource block (PRB) for the RAN;
    causing the one or more RAN devices to control power provided to an antenna associated with the RAN; or
    causing the one or more RAN devices to control a tilt of the antenna.

5. The method of claim 1, further comprising:
    when the device is associated with the core domain:
        providing the core data to a first management device associated with the edge domain;
    when the device is associated with the edge domain:
        providing the edge data to a second management device associated with the core domain and to a third management device associated with the RAN; and
    when the device is associated with the RAN:
        providing the RAN data to the first management device associated with the edge domain.

6. The method of claim 1, wherein:
    the device includes one or more of:
        a network data analytics function (NWDAF) device, or
        a self-organizing network (SON) device;
    the one or more core devices include one or more of:
        a unified data management (UDM) device,
        an authentication server function (AUSF) device,
        a network slice selection function (NSSF) device,
        a policy control function (PCF) device,
        a network function repository function (NRF) device, or
        an access and mobility management function (AMF);
    the edge domain of the network includes one or more edge devices that include one or more of:

a PCF device,
a session management function (SMF) device, or
an AMF device; and
the RAN includes one or more RAN devices that include one or more of:
an eNodeB (eNB),
a gNodeB (gNB),
a common public radio interface (CPRI), or
an eCPRI.

7. The method of claim 1, wherein the core data, the edge data, and the RAN data are received in real time and wherein the method further comprises:
preventing race conditions between the core domain, the edge domain, and the RAN based on the core data, the edge data, and the RAN data.

8. A device, comprising:
one or more memories; and
one or more processors, communicatively coupled to the one or more memories, to:
receive:
analytics data associated with management of a network associated with the device,
core data associated with a core domain of the network,
edge data associated with an edge domain of the network, and
radio access network (RAN) data for a RAN associated with the network;
process the analytics data, the core data, the edge data, and the RAN data, with a machine learning model, to determine one or more actions,
wherein the one or more actions are to be performed with respect to one or more of:
the core domain of the network,
the edge domain of the network, or
the RAN;
cause one or more core devices associated with the core domain of the network to rebalance a network slice and/or a network function associated with the network;
translate service level agreements (SLAs) into network resource requirements;
verify the network resource requirements against current network resource availability; and
cause, based on verifying the network resource requirements, the one or more core devices to provide feedback for at least one of a design of a network slice or service level agreement guarantees.

9. The device of claim 8, wherein the one or more processors are further to:
cause the one or more core devices to adjust a load associated with the core domain.

10. The device of claim 8, wherein, the one or more processors are further to:
cause one or more edge devices, associated with the edge domain of the network, to provide mobile edge computing (MEC) routing for the edge domain;
cause the one or more edge devices to select a user plane function (UPF) associated with the edge domain; or
cause the one or more edge devices to provide a particular service experience.

11. The device of claim 8, wherein the one or more processors are further to:
cause one or more RAN devices, associated with the RAN, to optimize RAN handover for the RAN;
cause the one or more RAN devices to provide a RAN anomaly detection service;
cause the one or more RAN devices to select a particular band and/or a particular physical resource block (PRB) for the RAN;
cause the one or more RAN devices to control power provided to an antenna associated with the RAN; or
cause the one or more RAN devices to control a tilt of the antenna.

12. The device of claim 8, wherein the one or more processors are further to:
when the device is associated with the core domain:
provide the core data to a first management device associated with the edge domain;
when the device is associated with the edge domain:
provide the edge data to a second management device associated with the core domain and to a third management device associated with the RAN; and
when the device is associated with the RAN:
provide the RAN data to the first management device associated with the edge domain.

13. The device of claim 8, wherein:
the device includes one or more of:
a network data analytics function (NWDAF) device, or
a self-organizing network (SON) device;
the one or more core devices include one or more of:
a unified data management (UDM) device,
an authentication server function (AUSF) device,
a network slice selection function (NSSF) device,
a policy control function (PCF) device,
a network function repository function (NRF) device, or
an access and mobility management function (AMF);
the edge domain includes one or more edge devices that include one or more of:
a PCF device,
a session management function (SMF) device, or
an AMF device; and
the RAN includes one or more RAN devices that include one or more of:
an eNodeB (eNB),
a gNodeB (gNB),
a common public radio interface (CPRI), or
an eCPRI.

14. The device of claim 8, wherein the core data, the edge data, and the RAN data are received in real time, and wherein the one or more processors are further to:
prevent race conditions between the core domain, the edge domain, and the RAN based on the core data, the edge data, and the RAN data.

15. A non-transitory computer-readable medium storing instructions, the instructions comprising:
one or more instructions that, when executed by one or more processors of a device, cause the one or more processors to:
receive:
analytics data associated with management of a network associated with the device,
core data associated with a core domain of the network,
edge data associated with an edge domain of the network, and
radio access network (RAN) data for a RAN associated with the network;
process the analytics data, the core data, the edge data, and the RAN data, with a machine learning model, to determine one or more actions,
wherein the one or more actions are to be performed with respect to one or more of:

the core domain of the network,
the edge domain of the network, or
the RAN;
cause one or more core devices associated with the core domain of the network to rebalance a network slice and/or a network function associated with the network;
translate service level agreements (SLAs) into network resource requirements;
verify the network resource requirements against current network resource availability; and
cause, based on verifying the network resource requirements, the one or more core devices to provide feedback for at least one of a design of a network slice or service level agreement guarantees.

16. The non-transitory computer-readable medium of claim 15, wherein the instructions further comprise:
one or more instructions that, when executed by the one or more processors, cause the one or more processors to:
cause the one or more core devices to adjust a load associated with the core domain.

17. The non-transitory computer-readable medium of claim 15, wherein the instructions further comprise:
one or more instructions that, when executed by the one or more processors, cause the one or more processors to:
cause one or more edge devices, associated with the edge domain, to provide mobile edge computing (MEC) routing for the edge domain;
cause the one or more edge devices to select a user plane function (UPF) associated with the edge domain; or
cause the one or more edge devices to provide a particular service experience.

18. The non-transitory computer-readable medium of claim 15, wherein the instructions further comprise:
one or more instructions that, when executed by the one or more processors, cause the one or more processors to:
cause one or more RAN devices, associated with the RAN, to optimize RAN handover for the RAN;
cause the one or more RAN devices to provide a RAN anomaly detection service;
cause the one or more RAN devices to select a particular band and/or a particular physical resource block (PRB) for the RAN;
cause the one or more RAN devices to control power provided to an antenna associated with the RAN; or
cause the one or more RAN devices to control a tilt of the antenna.

19. The non-transitory computer-readable medium of claim 15, wherein the instructions further comprise:
one or more instructions that, when executed by the one or more processors, cause the one or more processors to:
when the device is associated with the core domain:
provide the core data to a first management device associated with the edge domain;
when the device is associated with the edge domain:
provide the edge data to a second management device associated with the core domain and to a third management device associated with the RAN; and
when the device is associated with the RAN:
provide the RAN data to the first management device associated with the edge domain.

20. The non-transitory computer-readable medium of claim 15, wherein the core data, the edge data, and the RAN data are received in real time, and
wherein the instructions further comprise:
one or more instructions that, when executed by the one or more processors, cause the one or more processors to:
prevent race conditions between the core domain, the edge domain, and the RAN based on the core data, the edge data, and the RAN data.

* * * * *